(12) United States Patent
Syrtsov et al.

(10) Patent No.: US 8,321,545 B2
(45) Date of Patent: Nov. 27, 2012

(54) SERVICE ORIENTED PLATFORM ARCHITECTURE FOR A WIRELESS NETWORK

(75) Inventors: Pavel Syrtsov, San Francisco, CA (US); Vikranth Reddy, Foster City, CA (US); Janakiraman Gopalan, San Jose, CA (US); Srinivas Mandyam, San Jose, CA (US); Krishna Vedati, San Jose, CA (US); Kelvin Chong, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 2235 days.

(21) Appl. No.: 10/891,619

(22) Filed: Jul. 15, 2004

(65) Prior Publication Data

US 2006/0036773 A1    Feb. 16, 2006

(51) Int. Cl.
*G06F 15/173* (2006.01)

(52) U.S. Cl. ........ 709/223; 709/202; 719/311; 717/121; 705/7

(58) Field of Classification Search .................. 709/223, 709/202; 719/311; 717/121; 705/7
See application file for complete search history.

(56) References Cited

U.S. PATENT DOCUMENTS

| | | | |
|---|---|---|---|
| 6,134,581 A * | 10/2000 | Ismael et al. | 709/202 |
| 6,836,773 B2 | 12/2004 | Tamayo et al. | |
| 6,968,553 B1 * | 11/2005 | Theeten | 719/311 |
| 7,069,101 B1 | 6/2006 | Arackaparambil et al. | |
| 7,103,874 B2 * | 9/2006 | McCollum et al. | 717/121 |
| 7,130,807 B1 * | 10/2006 | Mikurak | 705/7.25 |

OTHER PUBLICATIONS

International Search Report and Written opinion mailed on Nov. 9, 2006 in counterpart International Application No. PCT/US05/22323.
International Preliminary Report on Patentability dated Jan. 16, 2007 in counterpart International Application No. PCT/US05/22323.

* cited by examiner

*Primary Examiner* — Tammy Nguyen

(57) ABSTRACT

Described is a framework system residing on a network including a plurality of services, wherein each of the services registers with the framework system, a service manager to manage each of the services which register with the framework system, the management including lifecycle management for each of the services and a communication broker to manage communication between the plurality of services.

25 Claims, 10 Drawing Sheets

US 8,321,545 B2

SERVICE ORIENTED PLATFORM ARCHITECTURE FOR A WIRELESS NETWORK

INCORPORATION BY REFERENCE

U.S. patent application, entitled "Integrated Management of a Wireless Network," filed on an even date herewith is assigned to the Assignee of the present application and is expressly incorporated herein, in its entirety, by reference.

BACKGROUND INFORMATION

Wireless networks are deployed in a great number of industries such as retail environments, transportation and logistics, manufacturing, warehousing, etc. These wireless networks may include large numbers of mobile units, wireless switches and access points. To maintain these networks routine tasks such as component roll-outs, updates, maintenance, support, etc. need to be performed. However, as the networks grow, the performance of these routine tasks becomes unwieldy. This may become a barrier to growth and result in the underutilization of the wireless network.

SUMMARY OF THE INVENTION

A framework system residing on a network including a plurality of services, wherein each of the services registers with the framework system, a service manager to manage each of the services which register with the framework system, the management including lifecycle management for each of the services and a communication broker to manage communication between the plurality of services.

Furthermore, a method including starting a first and second service by a service manager, instantiating the first and second service by registering the first and second service with a framework, the instantiating including generating a configuration file for each of the first and second services, wherein the configuration file includes a listing of interfaces for each of the first and second services, the configuration files being accessible to a communication broker and providing access to one of the interfaces of one of the first and second services by the other one of the first and second services via the communications broker.

In addition, a network appliance having a framework system for managing operations of a network on which the network appliance resides, the framework system including a plurality of services, wherein each of the services registers with the framework system, a service manager to manage each of the services which register with the framework system, the management including lifecycle management for each of the services and a communication broker to manage communication between the plurality of services.

DETAILED DESCRIPTION

Figure 1:
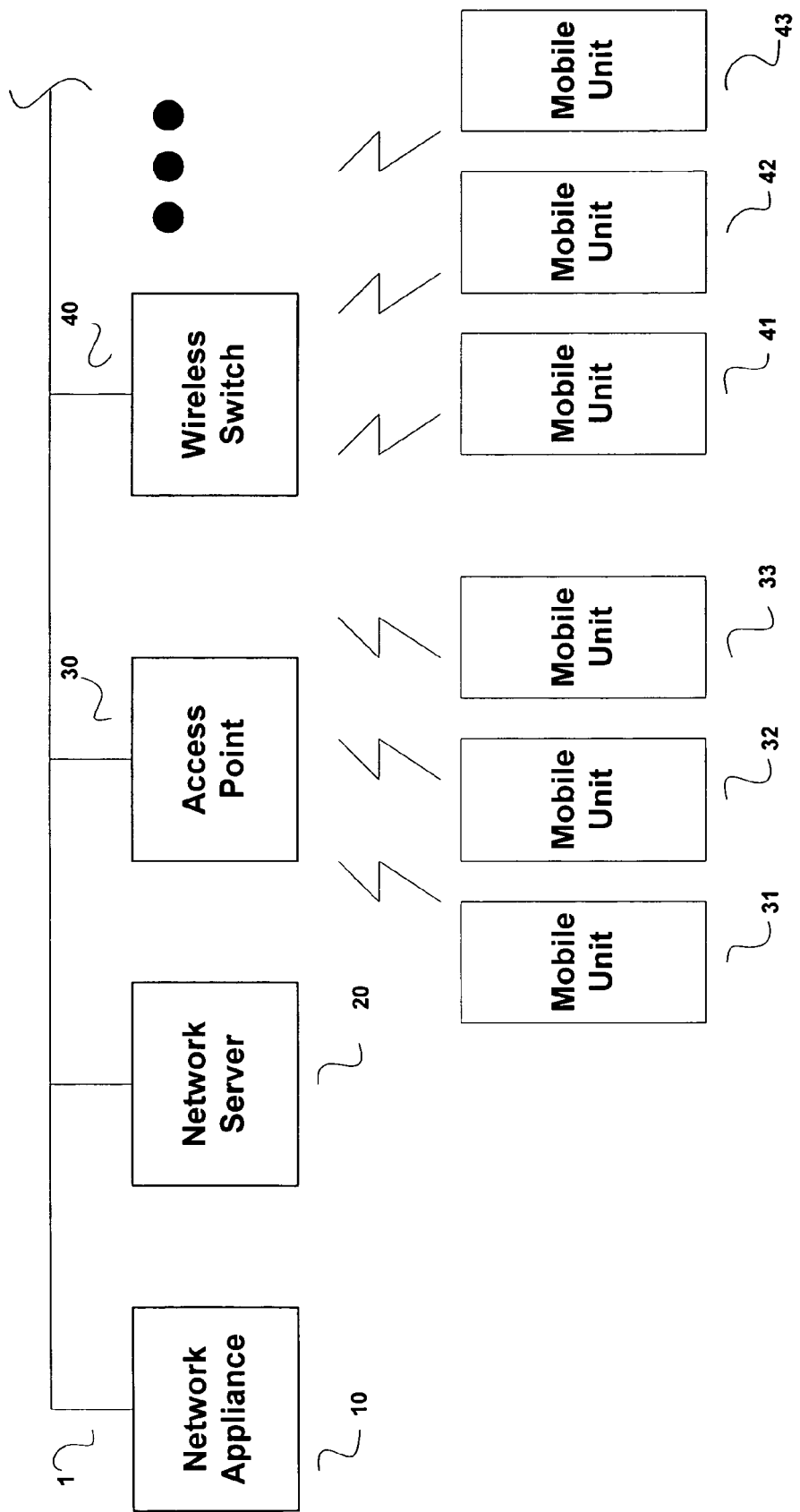
FIG. 1 shows an exemplary network including a wireless network which may implement an exemplary embodiment according to the present invention.

The present invention may be further understood with reference to the following description and the appended drawings, wherein like elements are provided with the same reference numerals. FIG. 1 shows an exemplary network 1 including a wireless network which may implement an exemplary embodiment of the present invention. The network 1 includes a network appliance 10, a network server 20, an access point 30 and a wireless switch 40. Each of these devices are shown as interconnected via a wired portion of the network 1. However, those of skill in the art will understand that these devices may also be wirelessly connected to the network 1. In addition, network 1 may also include any number of additional network components and/or devices (not shown).

FIG. 1 also shows mobile units 31-33 wirelessly connected to the network 1 via the access point 30. The mobile units 31-33 may be any type of computing or processor based device such as desktop or laptop computers, personal digital assistants, mobile phones, pagers, scanners, etc. The mobile units 31-33 and access point 30 may operate within any type of wireless networking environment, e.g., Wireless Local Area Network ("WLAN"), Wireless Wide Area Network ("WWAN"), etc. Communication between the mobile units 31-33 and the access point 30 may be accomplished using any wireless protocol such as IEEE 802.11, Bluetooth, etc. Similarly, mobile units 41-43 are wirelessly connected to the network 1 via the wireless switch 40. Those of skill in the art will understand that the network 1 is only exemplary and that the exemplary embodiment of the present invention may be implemented on any network which includes a wireless portion.

The owner of the above described exemplary network or any other network including wireless devices faces a variety of issues in operating and maintaining the network in its optimum state. Examples include that the owner of the network 1 may desire to add new devices, e.g., mobile units, access points, wireless switches, etc. The owner may desire to ensure that each of the mobile units includes the same version of software applications or update the applications on the mobile units.

Furthermore, the owner may desire to diagnose and resolve network problems either locally or remotely, e.g., slow response time. More effective monitoring would also allow the owner to diagnose problems before they occur so that they can be prevented. A host of other issues also arise such as the possible intermittent connectivity of mobile devices, security, application development, etc.

The exemplary embodiment of the present invention allows the owner of the network to address all of these issues and a variety of other issues relating to wireless networks by providing the owner with a centralized management system for the wireless network. The exemplary embodiment of the present invention provides a service delivery framework architecture for an enterprise mobility system which allows for any number of centralized services to be integrated into the framework architecture. The exemplary embodiment also allows these services to inter-communicate allowing a system administrator to both monitor and control the wireless network and the individual devices on the network. The exemplary embodiment of the system architecture will be described as residing on the network appliance 10 of the network 1. However, those of skill in the art will understand that the system architecture may reside on any of a variety of devices in the network 1, e.g., network server 20. Throughout this description the terms framework, architecture and framework architecture may be used to describe the exemplary embodiment of the present invention.

Figure 2:
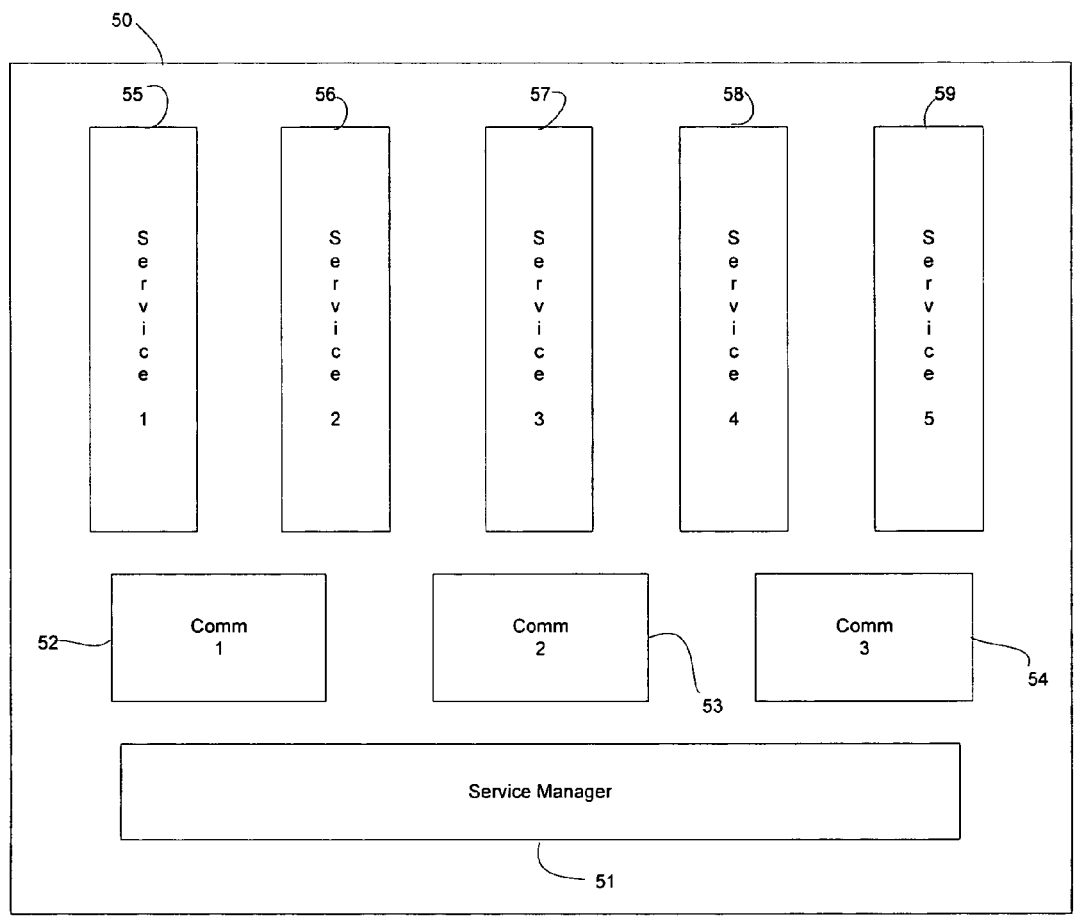
FIG. 2 shows an exemplary embodiment of a system architecture according to the present invention.

FIG. 2 shows an exemplary embodiment of a framework architecture 50. The exemplary framework architecture 50 includes a service manager 51, communications brokers 52-54 and services 55-59. In the exemplary embodiment the service architecture 50 may be built using Java and run on a Java Virtual Machine ("JVM"). However, those of skill in the art will understand that the service architecture of the present invention is not limited to Java implementations.

The service manager 51 manages all services 55-59 that register with the framework architecture 50. The management of services includes the creation of services and lifecycle management such as start, stop, suspend, resume, initialize and dispose operations. The service manager 51 will also include the ability to add new services to the framework 50 and dispose old services from the framework 50. Additional details on the service manager 51 will be provided below.

The communications brokers 52-54 will provide communication primitives for the framework 50. The communication primitives may be used for interaction between the services 55-59. The communication brokers 52-54 may also provide a mechanism to locate service interfaces by name. The exemplary embodiment shows three communications brokers 52-54. However, there may be more or less brokers depending on the specific applications. Exemplary communications brokers may include a messaging broker (e.g., Java Messaging Service ("JMS"), a Java Naming and Directory Interface ("JNDI"), etc.

The services 55-59 may be any service that is applicable for the management and control of the wireless network 1. There may be two general types of services—basic services and composite services. Basic services are those services which provide basic functionality for the framework 50. Exemplary basic services 55-59 may include scheduling, configuration, logging, security, licensing, dependencies, etc. Composite services are those services which address the operational and business purposes of the network 1 and build upon the basic services. Examples of composite services include network device monitoring, network device remote control, alarms, network mapping, etc. Additional examples of composite services are provided in U.S. patent application, entitled "Integrated Management of a Wireless Network," filed on an even date herewith.

A service may be considered a function that is well defined, self contained and does not depend on the context or state of other services. While each of the services 55-59 are self contained, multiple services 55-59 may communicate or coordinate their functionality. The services 55-59 are modular and may be plugged into the framework 50 as needed.

The network 1 of FIG. 1 may have numerous devices which are spread out over a wide geographical area making it difficult to manage the entire network. Thus, it is a great advantage to be able to manage the network 1 from a single remote location which is connected to the network. The network appliance 10 may include a system for such management of the network 1. The system may be based on the framework 50 described above and include various services which a system administrator may use to perform the network management functions. Thus, the system on the network appliance 10 may provide the centralized location for the network management.

The system may receive information and attributes from each of the mobile units 31-33 and 41-43 in the network 1. This transmission of attributes may be controlled by a software component on the mobile units. For a more detailed description of an exemplary software component called a wireless agent, refer to U.S. patent application entitled "Integrated Management of a Wireless Network" filed on an even date herewith. However, the present invention is aimed at a framework architecture for the plugging in of services to be used to manage and control the wireless network and is not directly concerned with the mechanism for collection. The collection of attributes is merely included to provide an example of a business service that may be provided for the network.

Figure 3:
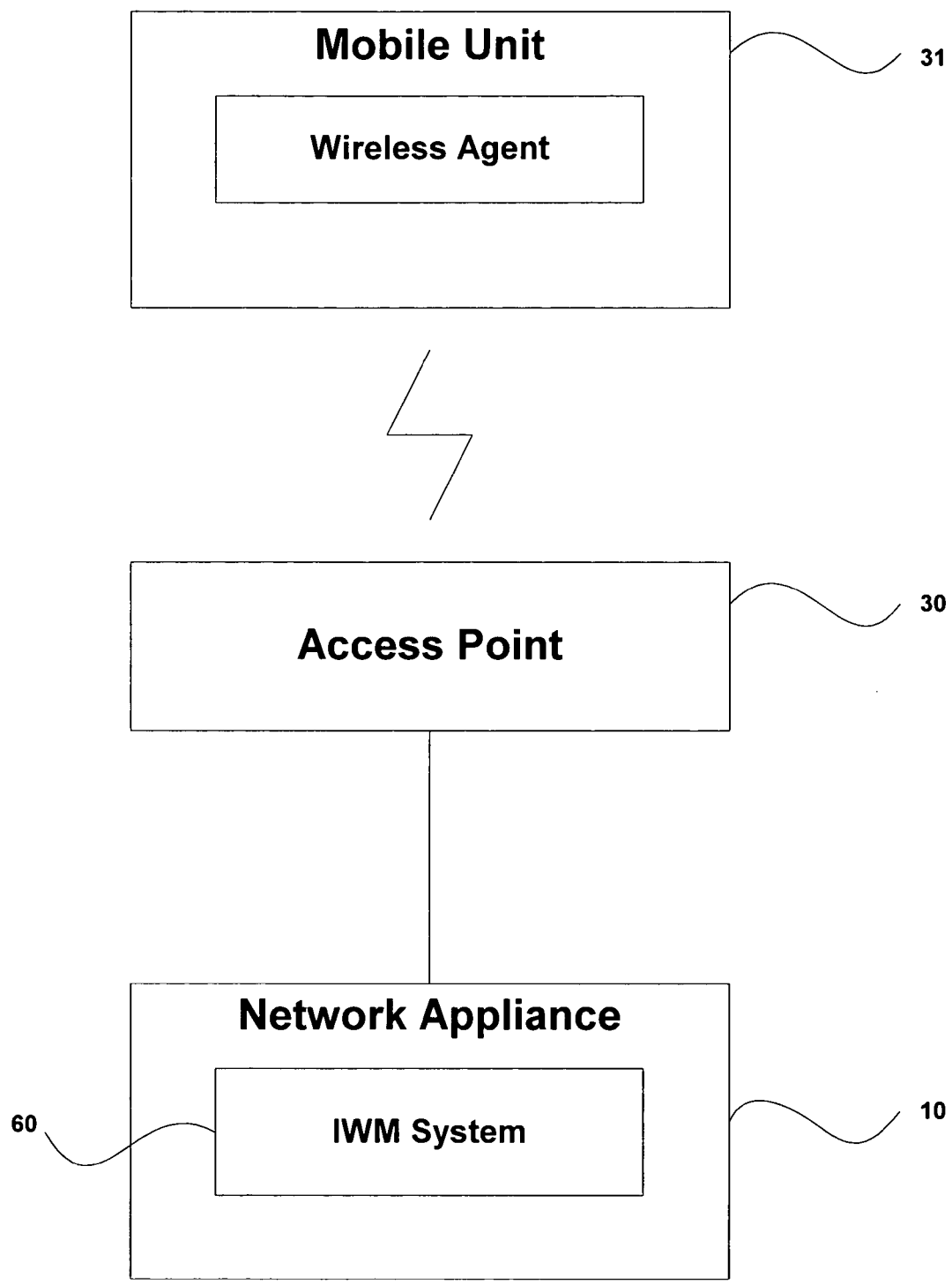
FIG. 3 shows an exemplary communication path between network devices according to the present invention.

FIG. 3 shows an exemplary communication path between network devices. In this example the communication path is between the mobile unit 31 the access point 30 and the network appliance 10. The communication path operates bi-directionally, i.e., the network appliance 10 may send messages to the mobile unit 31 and vice versa. The network appliance 10 is shown as including an Integrated Wireless Management ("IWM") system 60. This is the system which may be used to manage the wireless network. The framework 50 is the basis of including services for the IWM system 60.

Figure 4:
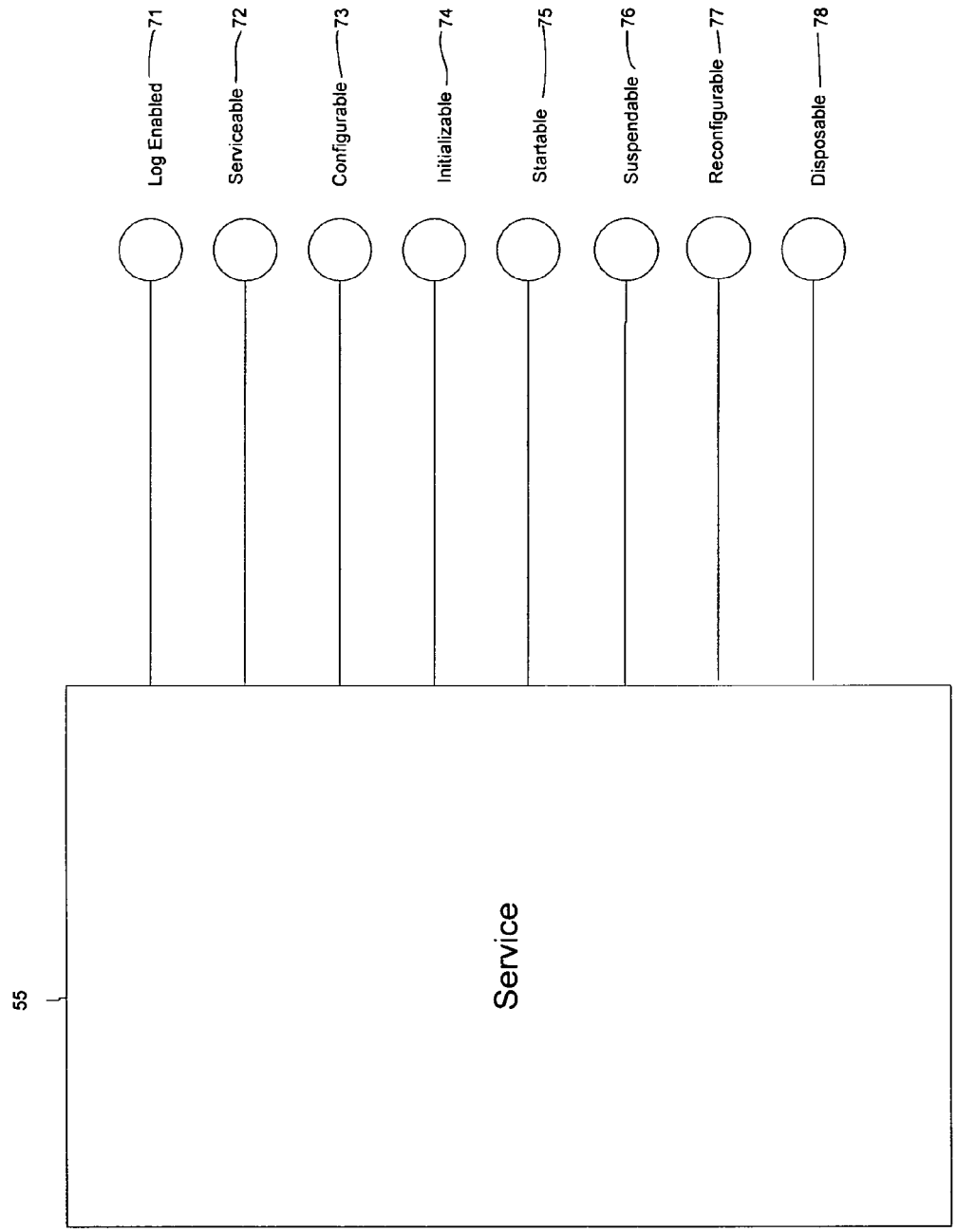
FIG. 4 shows an exemplary service which includes a set of predefined interfaces according to the present invention.

In the exemplary embodiment, each of the exemplary services 55-59 is an instance of a Java class. Each of the services 55-59 expose predefined interfaces for interaction by the service manager 51. FIG. 4 shows an exemplary service 55 which includes a set of predefined interfaces 71-78. Each service 55-59 does not need to expose all the exemplary interfaces 71-78. As will become apparent from the description of the exemplary interfaces 71-78, some of these interfaces are required for the basic functionality of the service, e.g., starting the service. In addition, there may be other predefined interfaces which one of skill in the art may find useful for the lifecycle management of a service.

The following will provide a brief description of each of the interfaces 71-78 as relating to the service 55. The specific Java class methods or other methods related to the exposed interface will be apparent to one of skill in the art based on the description of the interface 71-78. The LogEnabled interface 71 will enable logging for the service 55 and will be implemented by those services which will use a centralized logging service. The Serviceable interface 72 will allow the service 55 to have access to the service manager 51 information and provides a service context for the service 55.

If the service 55 needs to be configured using persistent configuration information, the service 55 will implement the Configurable interface 73. This will provide a configuration object that maintains configuration information for the service 55. The Initializable interface 74 will be implemented if the service 55 needs to allocate resources prior to becoming active. The initialization may include allocating any resources required throughout the service 55 lifecycle.

The Startable interface 75 is implemented for methods to start and stop the service 55. The Suspendable interface 76 is implemented if the service manager 51 has the ability to suspend operation of the service 55. Methods to suspend and resume the service 55 will be associated with the Suspendable interface 76. For example, the service manager 51 may suspend the service 55 before updating resources upon which the service 55 depends.

The Reconfigurable interface 77 will be implemented when the service 55 may be reconfigured, i.e., the configuration is updated. Finally, the Disposable interface 78 is implemented by the service 55 if it holds resources to dispose of the service 55 at the end of its life. Thus, the service manager 51 will call the dispose method to release and destroy any resource that the service 55 owns at the end of its service life, i.e., the service 55 is stopped and will not be used anymore.

Each of the these interfaces 71-78 and any other required or optional interfaces may be implemented by the service manager 51. Thus, as described above, the service manager 51 may create new services by allowing the individual services to inherit these interfaces from the service manager 51. The individual services 55-59 will include the various methods to implement the functionality provided by the service, e.g., logging function, deployment function, etc., but these generic interfaces 71-78 which allow each service to be plugged into the framework 50 may be inherited from the service manager 51. The service manager 51 will also instantiate each of the services 55-59 into the framework 50 including any dependencies for the service 55-59. The instantiation of services will be discussed in more detail below.

Figure 5:
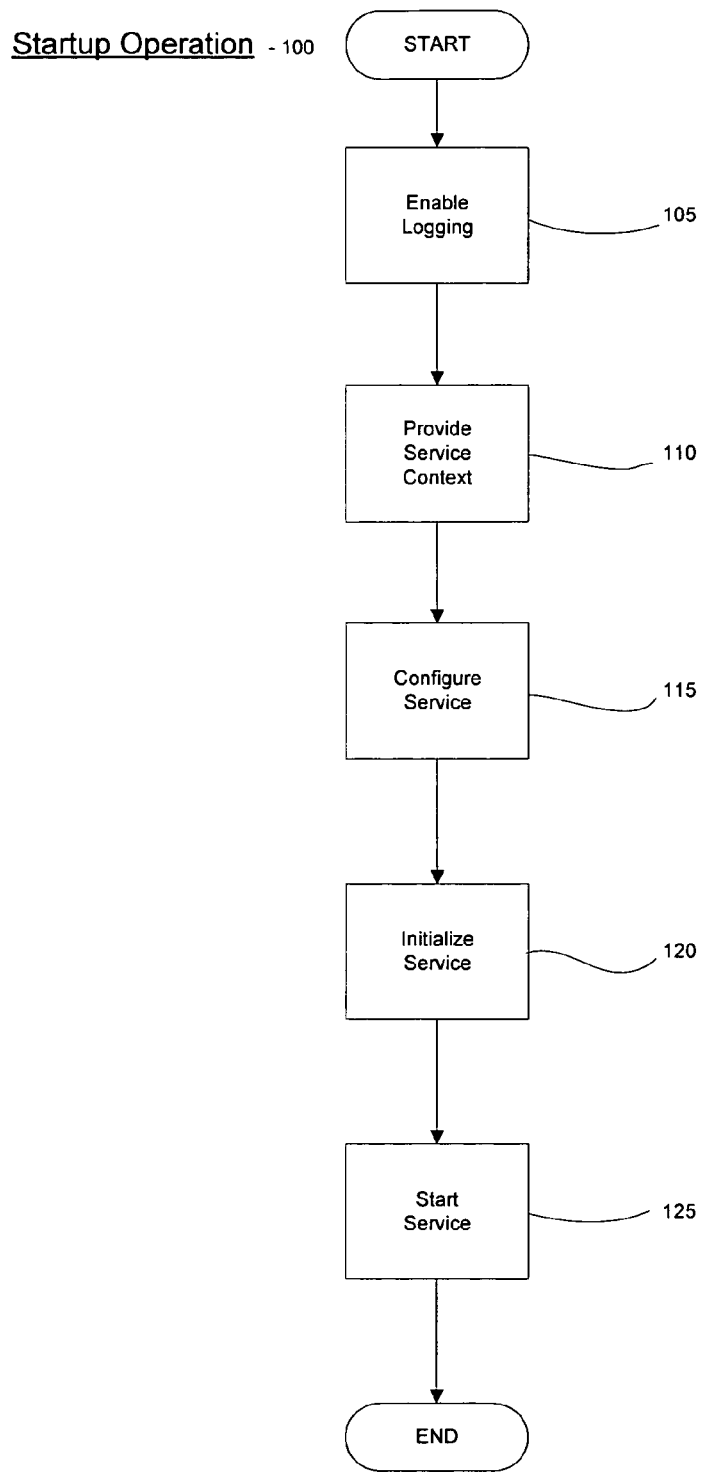
FIG. 5 shows an exemplary path for a service in a startup phase according to the present invention.
Figure 6:
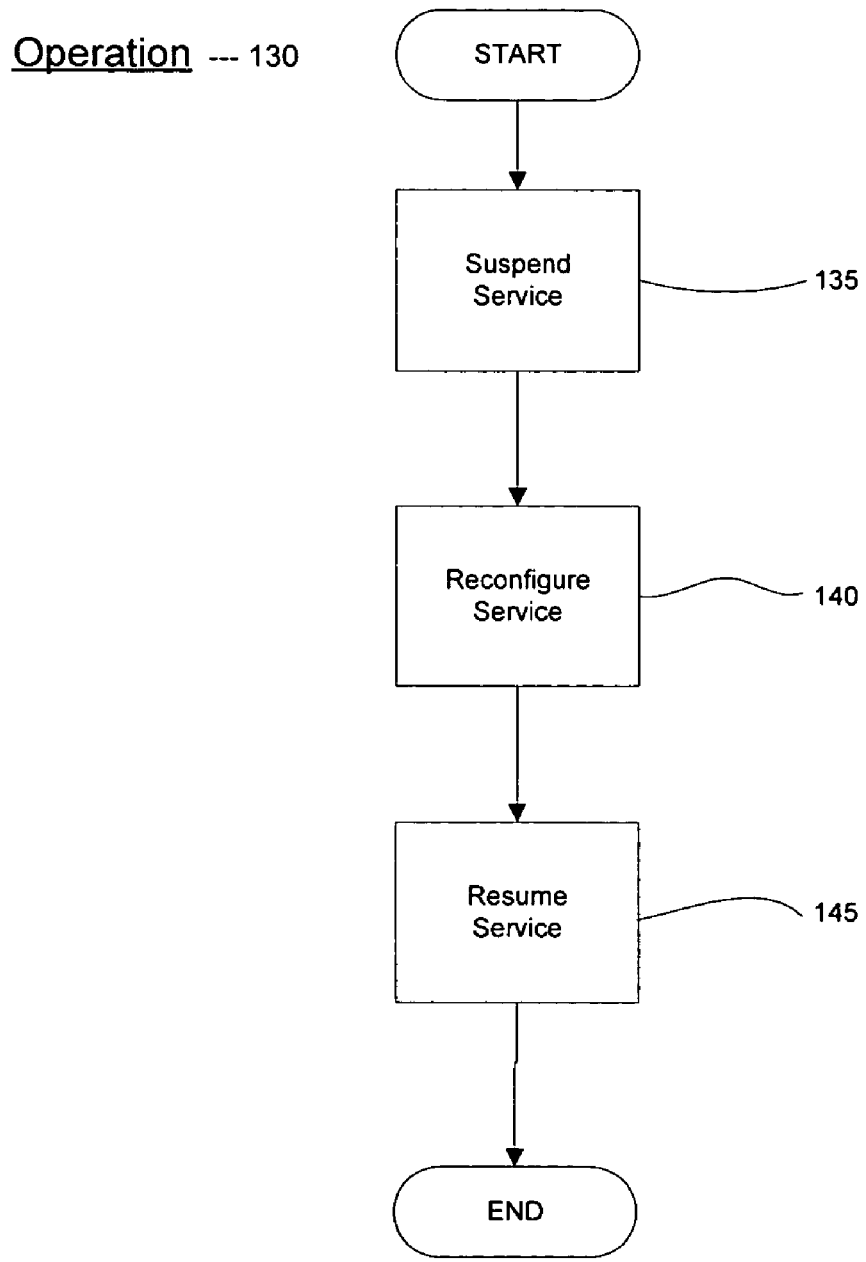
FIG. 6 shows an exemplary path for a service during an operational phase according to the present invention.
Figure 7:
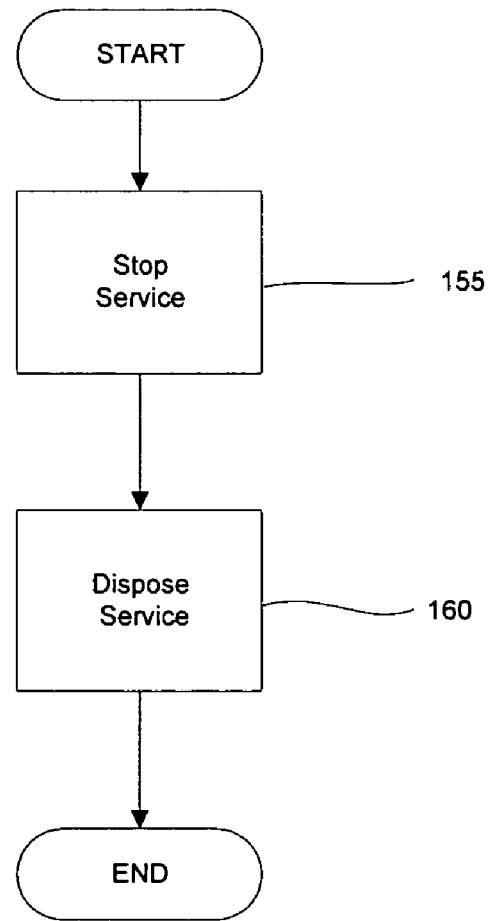
FIG. 7 shows an exemplary path for a service in a shutdown phase according to the present invention.

While there is no specific requirement for the flow of events for a service, FIGS. 5-7 provide exemplary flow paths for a service which implements all of the above described interfaces 71-78. FIG. 5 shows an exemplary path for a service in a startup phase 100, i.e., instantiation of a service. The service manager 51 will access the appropriate methods for the interfaces. In a first step 105, the service manager 51 will enable logging for the service by accessing the LogEnabled interface 71. The service manager 51 will then provide the service context by accessing Serviceable interface 72 in step 110. The service will then be configured using the Configurable interface 73 in step 115. The service is then initialized using the Initializable interface 74 in step 120. Finally, the service manager 51 will start the service using the Startable interface 75 in step 125. At the completion of the process 100, the service has been instantiated and started within the framework 50.

FIG. 6 shows an exemplary path for lifecycle management of a service during an operational phase 130, i.e., normal operation between startup and shutdown. The service manager 51 may suspend the service using the Suspendable interface 76 in step 135. While the service is suspended, the service may be reconfigured using the Reconfigurable interface 77 in step 140. The service manager 51 may then resume the service using the resume method which is also part of the Suspendable interface 76. The operational phase 130 refers to those lifecycle management operations which may be taken by the service manager 51 with respect to the service. Those of skill in the art will understand that during normal operations, the service may perform all the features and functionality associated with the service.

FIG. 7 shows an exemplary path for a service in a shutdown phase 150. In step 155, the service manager 51 may stop the service using the stop method of the Startable interface 75. In step 160, the service manager 51 may release all the resources being used by the stopped service and dispose of the service if the service will not be used again. The dispose method is accessed via the Disposable interface 78. Thus, at the end of the process 150, the service has been removed from the framework 50 and all the resources allocated to the service have been released.

Thus, the above described how the service manager 51 controls the lifecycle of each of the services which are plugged into the framework 50. Any service which implements the above described interfaces or their equivalents can be managed by the service manager 51 and therefore be used within the framework 50 to provide a service or set of services to a system administrator that is managing the wireless network 1.

The following is a brief description of some exemplary basic services that may be plugged into the framework 50. The described services are only exemplary and those of skill in the art will understand that there are numerous composite services that may be plugged into the framework 50 to provide a system administrator with functionality to manage and control the network 1. The first exemplary basic service is a scheduler service which may provide a facility for threads to schedule tasks for future execution in a background thread. The scheduler service may schedule tasks for one time execution or for repeated execution at regular intervals.

The scheduler service may be based on the Timer and TimerTask that are part of Java version 1.3. The Timer provides the ability for other services to schedule tasks, while the TimerTask forms the base for tasks created by other services. Each Timer object will have a corresponding background thread that is used to execute the timer's tasks in sequential order.

As described above, for the scheduler service and for all the other exemplary services described above, the service manager 51 will create and instantiate the service into the framework 50 which will include inheriting some or all of the exemplary interfaces 71-78 described above. This allows the service manager 51 to manage the lifecycle of the service scheduler as described above.

Any other interfaces exposed by the scheduler service relate to the functionality of the scheduler service. In this example, the scheduler may expose a PreconfiguredSchedule interface which allows consumer services to add tasks to be executed. A DynamicSchedule interface may also be exposed which allows a consumer service to both add a task and schedule the task.

A second exemplary basic service is a heartbeat service which provides functionality for services to monitor themselves for failures. The heartbeat service may provide a feature for services to be continuously monitored or for ad hoc management. The scheduling of these tasks may be performed by the scheduler service. A service that desires continuous monitoring will implement a heartbeatable interface which allows for the creation of a monitor thread when the service is started and checks that the service is alive at configurable intervals. The ad hoc monitoring may be performed by a service prior to engaging in a time consuming task.

A third exemplary basic service is a logging service which provides the ability for services to log events. The logger service provides a client API that forms an abstraction layer over various implemented logging libraries, e.g., JDK 1.4, Apache's Log4J, etc. Any service which needs a logger instance will implement the LogEnabled interface 71. The logging service will then use the libraries to record the events as required and save the events to, for example, a file, a database, etc.

A fourth exemplary basic service is a configuration service which is responsible for persisting and retrieving service configurations. A configuration object will describe the different parameters associated with the configuration of a service. The configuration service allows services to store and retrieve configuration parameters.

Other exemplary basic services include a deployment service providing a centralizes service archive deployment management capabilities. Licensing services for providing centralized license management across services. Security services for enforcing security policies for service communications. Administration services for providing services to view and manage the services running in the framework 50.

The exemplary services described above are basic services for the operation of the framework 50. More complex services for the management and control of the network 1 may also be implemented. These services may include, for example, monitoring of mobile units, management of mobile units, monitoring access points, diagnostic operations for the network, etc. The U.S. patent application entitled "Integrated Management of a Wireless Network" filed on an even date herewith, which is expressly incorporated by reference herein, provides examples of additional functions for monitoring and controlling the network 1.

Figure 8:
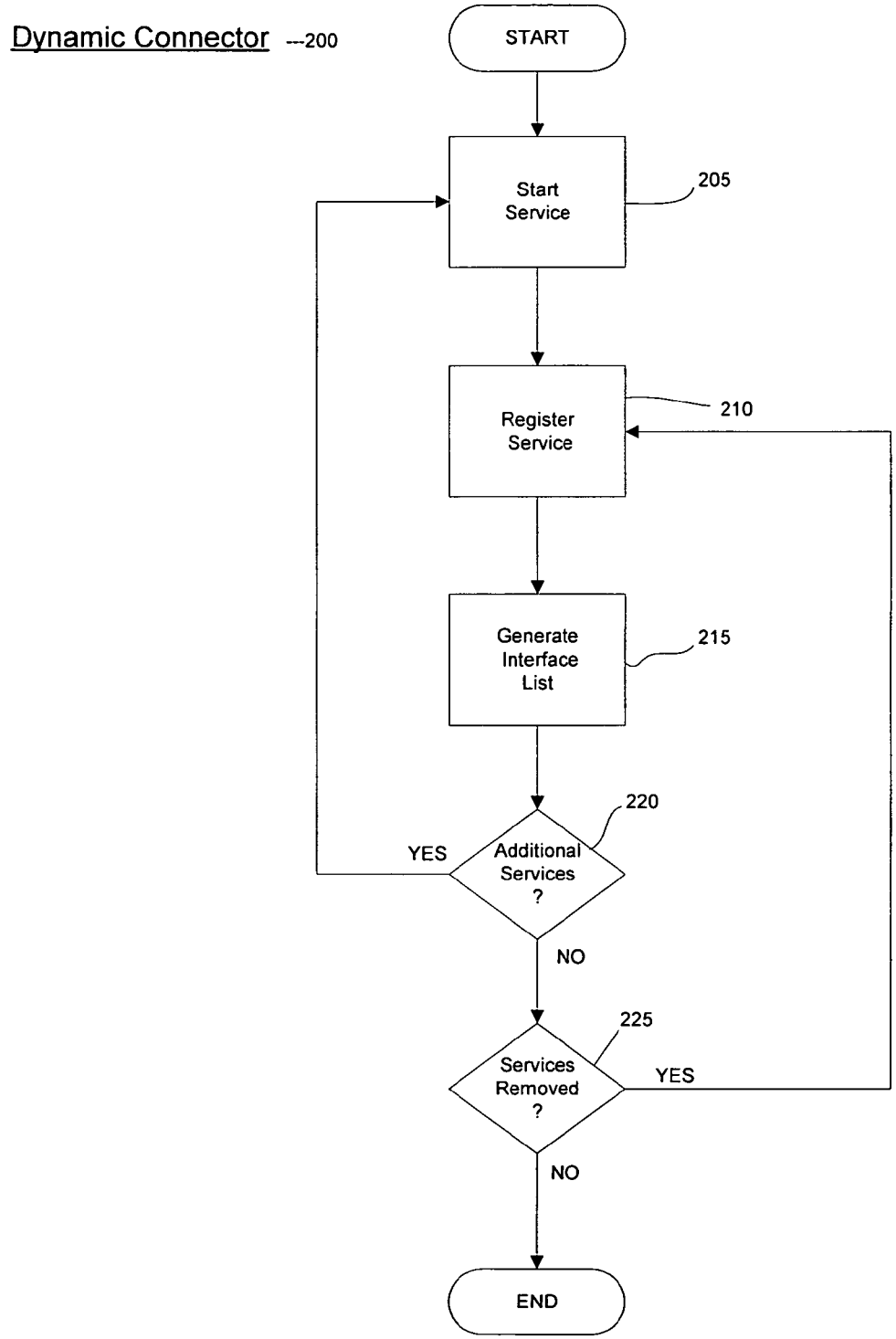
FIG. 8 shows an exemplary process for creating dynamic connections within the framework according to the present invention.

The various services which are plugged into the framework 50 may communicate and use the services offered by other services. The framework architecture 50 allows this to be accomplished by maintaining dynamic connections within the framework 50. FIG. 8 shows an exemplary process 200 for creating the dynamic connections within the framework 50. The process 200 will be described with reference to FIG. 9 which illustrates a sample flow of the dynamic connection process on the components within the framework 50.

In step 205, the service manager 51 starts the service 55. The service manager 51 may be configured to start the services to be included in the framework 50 in a specific order. This order may be stored, for example, in a configuration table of a database accessible by the service manager 51. In this example, the service manager is configured to start the services in the order 55, 56, 57, 58 and 59. As described above with reference to FIG. 5, the service manager may start the first service 55 by accessing the methods exposed by the service 55 such as configuration and initialization.

Figure 9:
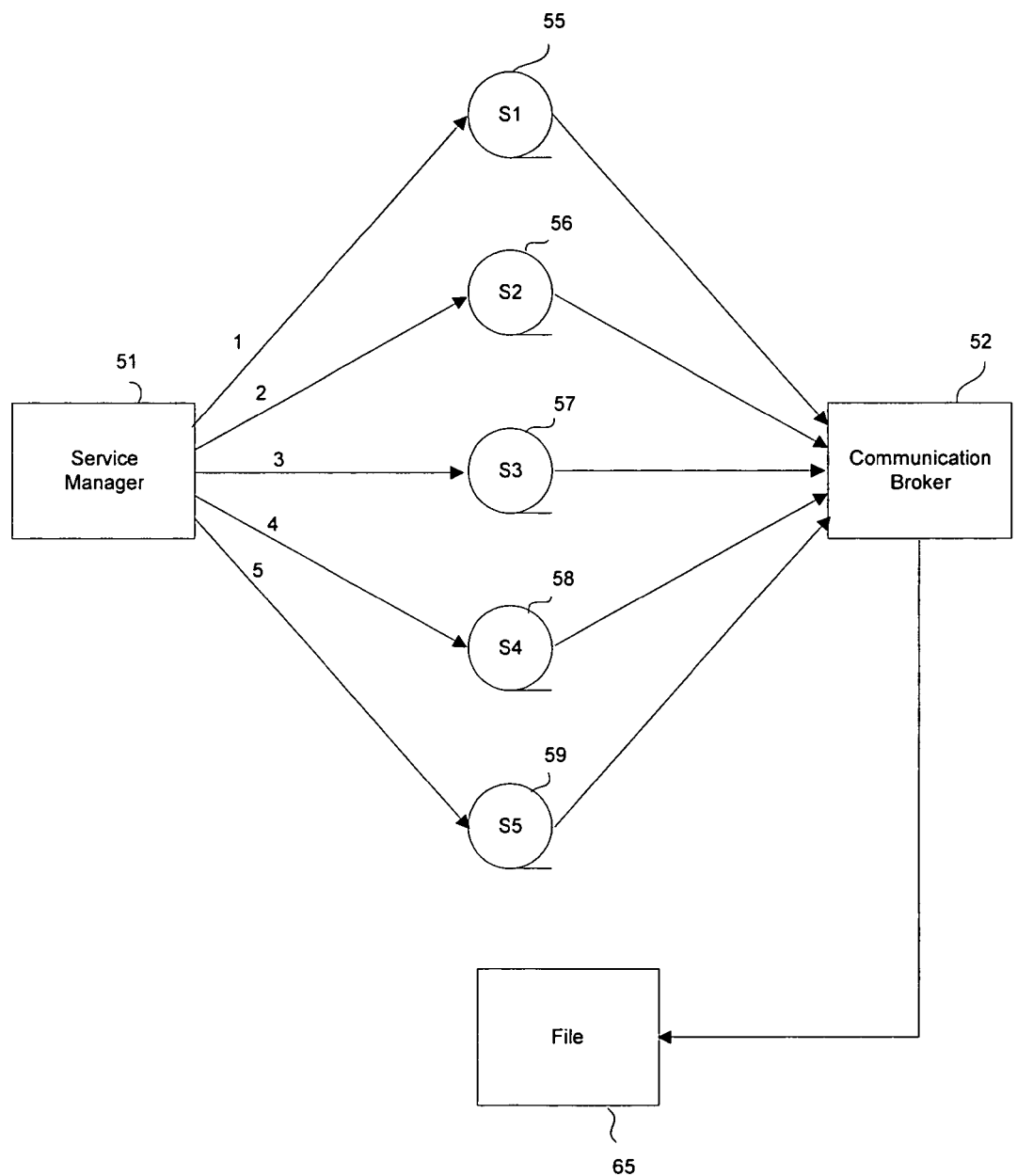
FIG. 9 illustrates a sample flow of the dynamic connection process on the components within the framework according to the present invention.

In step 210, each of the services which are instantiated in the framework 50 will be registered. A naming service component is responsible for the registration of each of the services. The naming service is a basic service used for the purpose of this registration. Each of the services may be registered in the file 65 as shown in FIG. 9. The services are registered using a "serviceName" specified in the configuration file of the service. The "serviceName" may be used as a lookup key to locate an instance of the service. As described above, the service manager 51, as part of the instantiation of the service, will call the configurable interface 73 in order to properly configure the service. Thus, a configuration file will be associated with each service. This configuration file will include the "serviceName" for the service and will be registered when the service is instantiated.

The file 65 may be, for example, an XML file which contains a listing of the various parameters which will be stored for each service that is instantiated into the framework 50. The file 65 may also be a series of files or linked lists which contain the parameters. The information which will be described in this example may also be stored in other manners, e.g., database, table, etc. As will be described below, the only requirement for the storage of the parameters is that the parameters become searchable when they are stored.

In the next step 215, an interface list is generated for each of the registered services. The communications broker 52 accesses the configuration file for each of the registered services to determine the interfaces for each of the services. As described above each service may be a producer meaning that it has the capability of exposing interfaces to other services. Each service may also be a consumer meaning that it can consume interfaces exposed by other services. A service may be a producer and/or a consumer. The communication broker 52 has access to each of the configuration files for the services in order to know what each service is producing and consuming. This access allows the communication broker to provide other services access to the registered interfaces. This will be described in greater detail below.

In step 220, the process will determine if there are any other services which will be started. If there are additional services, the process continues back through steps 205-215 where the next service is started, registered and an interface list is generated. If there are no additional services to be started, the process continues to step 225 to determine if any services have been removed from the framework 50. As described above, when services are no longer needed they may be removed or disposed from the framework using the disposable interface 78. If a service is disposed, the process continues back to step 210 where the service is removed from the register list and to step 215 where the interface lists for the removed service is also deleted.

As part of the instantiation of a service, the communications broker 52 may also maintain a list of dependencies for each service. Thus, as described above, the exemplary heartbeat service is dependent on the exemplary scheduler service. The communications broker 52 will maintain this dependency and will not remove the scheduler service if the heartbeat service remains operative.

Thus, at the end of the process 200, the communication broker 52 has produced a current listing of all the started services and the producer and consumer interfaces for these services. Those of skill in the art will understand that the process 200 is an ongoing process that occurs continuously throughout the run-time of the framework 50 and the file 65 is updated as services are started and disposed.

Figure 10:
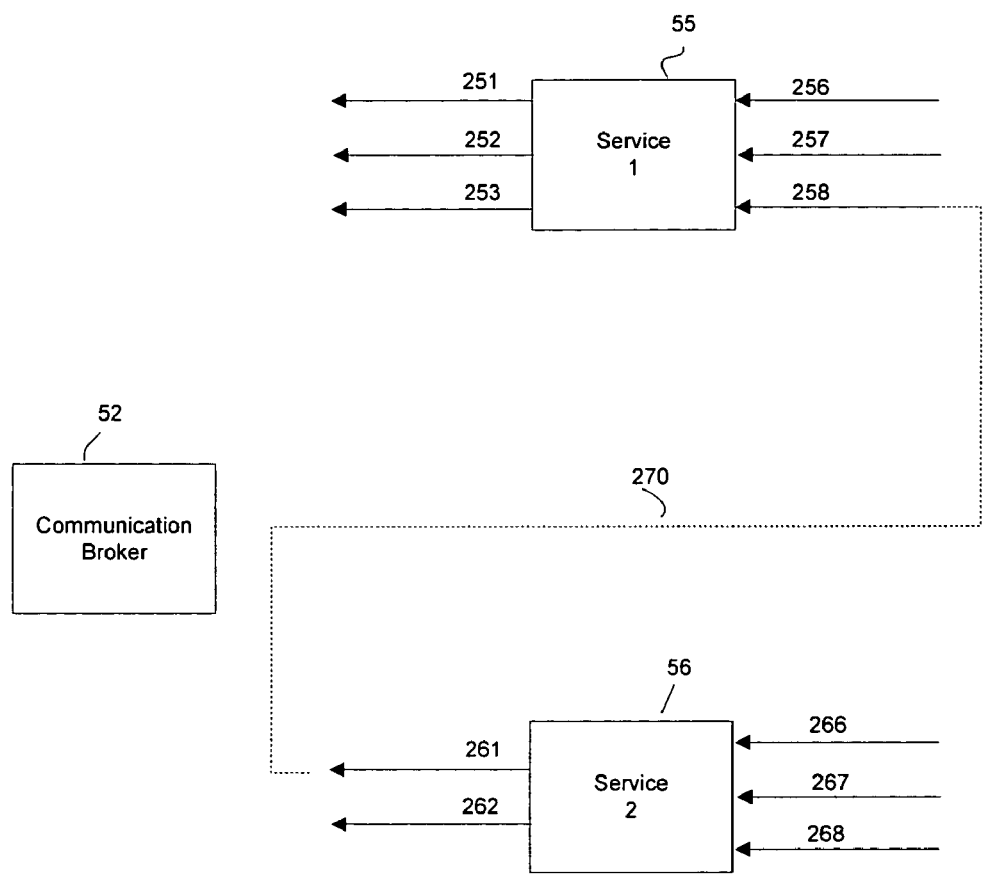
FIG. 10 shows an exemplary dynamic connection that is maintained during run time by the communication broker according to the present invention.

FIG. 10 shows an exemplary dynamic connection 270 that is maintained during run time by the communication broker 52. In this example, it may be considered that services 55 and 56 have been instantiated into the framework 50 by the service manager 51. The communications broker 52 has access to the producer and consumer interfaces for the services 55 and 56.

Those of skill in the art will understand that interfaces are exposed by objects. The interfaces are used for other objects to access methods which are contained in the object. The interfaces themselves are neither producers or consumers, but the service produces interface implementations for other (consumer) services, i.e., it provides a service or an output to other services, and/or a consumer of a service, i.e., it requires an input or a service from another service. In this description, interfaces are referred to as producer and/or consumer interfaces. These terms are used to refer to the producer outputs of the service or consumer inputs for the service.

In this example, the service 55 has interfaces 251-253 and interfaces 256-258. The service 56 has interfaces 261-262 and interfaces 266-268. In this example, the input 258 into the service 55 is from the interface 261 of the service 56. Thus, the service 55 is a consumer of the service 56 through the interface 261. The communication broker 52 has access to each of the configuration files for the services 55 and 56 including the information for the service 55 to access the interface 261 of the service 56.

For example, the service 55 may indicate that it needs the particular input 258 and the communication broker 52 will determine the matching output from another service by searching the file 65. The search may be performed by first locating the service provider instance by the given name of the service, e.g., serviceName described above. The found service is then asked to provide an interface instance for the given configuration provided by the consumer service configuration. In this example, the communication broker will find the interface output 261 of the service 56 and indicate to the service 55 how to access the interface 261 to be provided with the proper input. thus, the communication broker 52 maintains the dynamic connection 270 during runtime to allow the services 55 and 56 to operate in concert.

Thus, the communication broker 52 may be considered a centralized wiring service which allows the various services that are plugged into the framework 50 to communicate. The communication broker 52 makes the dynamic connections as the services are added and deleted from the framework. Using the above described framework 50, new services may be deployed during runtime and the service manager 51 and communication broker 52 work to integrate the new services into the framework. The framework is therefore open and expandable because any new services which are developed may be plugged into the framework 50.

Furthermore, the exemplary embodiment has been described with respect to a single framework 50 residing on the network appliance 50. Multiple framework architectures may be distributed throughout various devices on a network, e.g., multiple network appliances, network servers, etc. The above described framework architecture will allow the various services that are plugged into each framework to communicate because each framework will include the communication broker generated file containing the interfaces for each of the instantiated services.

For example, a framework resident on a first device may communicate its existence to a framework on a second device. The instantiated services on the second device may communicate with the instantiated services on the first device through the communication broker on the first device to determine if the services on the first device have any information needed by the services on the second device. Thus, services may be distributed throughout the entire network, but a system administrator on any particular device will have access to all the services of the network because of the framework architecture scheme according to the exemplary embodiment of the present invention.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A framework system residing on a network, comprising:
   a plurality of services, wherein each of the services registers with the framework system;
   a service manager to manage each of the services which register with the framework system, the management including lifecycle management for each of the services; and
   a communication broker to manage communication between the plurality of services.

2. The framework system of claim 1, wherein the lifecycle management includes one of a start function, a stop function, a suspend function, a resume function, an initialization function and a dispose function.

3. The framework system of claim 1, wherein the management further includes creation of new services.

4. The framework system of claim 1, wherein the plurality of services includes one of a scheduling service, a configuration service, a logging service, a security service, a licensing service and a dependency service.

5. The framework system of claim 1, wherein the plurality of services include composite services which address one of an operation and business purpose of the network.

6. The framework system of claim 1, wherein the network includes a wireless portion.

7. The framework system of claim 1, wherein the framework system resides on a network appliance.

8. The framework system of claim 1, wherein each of the plurality of services may be plugged-in to the framework system on an as needed basis.

9. The framework system of claim 1, wherein one of the plurality of services is a Java class.

10. The framework system of claim 9, wherein the Java class exposes an interface.

11. A method, comprising the steps of:
    starting a first service by a service manager;
    starting a second service by the service manager;
    instantiating the first and second service by registering the first and second service with a framework, the instantiating including generating a configuration file for each of the first and second services, wherein the configuration file includes a listing of interfaces for each of the first and second services, the configuration files being accessible to a communication broker; and
    providing access to one of the interfaces of one of the first and second services by the other one of the first and second services via the communications broker.

12. The method of claim 11, wherein the first service and the second service are started in a predetermined order.

13. The method of claim 11, wherein the starting step includes the service manager accessing methods exposed by the service.

14. The method of claim 11, wherein the instantiating step includes registering a name for each of the first and second services.

15. The method of claim 11, further comprising the steps of:
    determining dependencies between the first and second services by the communication broker; and
    storing a list of the dependencies.

16. The method of claim 11, wherein the providing step includes searching the configuration file of the one of the first and second services by the communication broker for a name of the one of the first and second services.

17. The method of claim 11, further comprising the steps of:
    starting a third service by the service manager;
    instantiating the third service by registering the third service with the framework, the instantiating including generating a configuration file for the third service, wherein the configuration file includes a listing of interfaces for the third service, the configuration file being accessible to the communication broker; and
    providing access to one of the interfaces of the third service by one of the first and second services via the communications broker.

18. The method of claim 11, wherein one of the interfaces are one of a producer interface and a consumer interface.

19. A network appliance, comprising a framework system for managing operations of a network on which the network appliance resides, the framework system including,
    a plurality of services, wherein each of the services registers with the framework system, a service manager to manage each of the services which register with the framework system, the management including lifecycle management for each of the services, and a communication broker to manage communication between the plurality of services.

20. The network appliance of claim 19, wherein the network is one of a local area network and a wide area network.

21. The network appliance of claim 19, wherein the network includes a wireless portion.

22. The network appliance of claim 19, wherein the framework system receives attributes from a wireless device and one of the plurality of services processes the attributes.

23. The network appliance of claim 19, wherein an additional service is plugged into the framework system.

24. The network appliance of claim 23, wherein the plugging in of the additional service includes registering the additional service with the framework system.

25. The network appliance of claim 19, wherein the communication broker provides access to an interface exposed by a first one of the plurality of services to a second one of the plurality of services.

* * * * *